US 8,730,648 B2

(12) United States Patent
Wozniak et al.

(10) Patent No.: US 8,730,648 B2
(45) Date of Patent: May 20, 2014

(54) ELECTRICAL COMPONENT

(75) Inventors: Uwe Wozniak, Deutschlandsberg (AT); Thomas Feichtinger, Graz (AT); Hermann Gruenbichler, St. Josef (AT); Pavol Dudesek, Bad Gams (AT); Thomas Puerstinger, Graz (AT)

(73) Assignee: Epcos AG, Munich (DE)

( * ) Notice: Subject to any disclaimer, the term of this patent is extended or adjusted under 35 U.S.C. 154(b) by 1334 days.

(21) Appl. No.: 12/090,335

(22) PCT Filed: Oct. 20, 2006

(86) PCT No.: PCT/EP2006/010148
§ 371 (c)(1),
(2), (4) Date: Aug. 31, 2009

(87) PCT Pub. No.: WO2007/045497
PCT Pub. Date: Apr. 26, 2007

(65) Prior Publication Data
US 2010/0014213 A1    Jan. 21, 2010

(30) Foreign Application Priority Data
Oct. 20, 2005 (DE) .......................... 10 2005 050 638

(51) Int. Cl.
*H01G 4/20* (2006.01)
*H01G 4/06* (2006.01)
*H01G 4/22* (2006.01)
*H01G 4/30* (2006.01)

(52) U.S. Cl.
USPC ..................... 361/321.4; 361/312; 361/301.4; 361/314; 361/320; 361/321.1; 361/321.2; 361/321.5

(58) Field of Classification Search
USPC .......... 361/321.1, 321.4, 321.2, 321.5, 301.4, 361/314, 320, 312
See application file for complete search history.

(56) References Cited

U.S. PATENT DOCUMENTS

| 4,209,764 | A |   | 6/1980  | Merz et al. |
| 4,868,711 | A |   | 9/1989  | Hirama et al. |
| 5,096,620 | A |   | 3/1992  | Ditz et al. |
| 5,583,738 | A | * | 12/1996 | Kohno et al. ................. 361/312 |
| 6,040,755 | A |   | 3/2000  | Abe et al. |
| 6,329,715 | B1 |  | 12/2001 | Hayashi |
| 6,563,689 | B2 | * | 5/2003 | Yamamoto ................. 361/306.1 |
| 6,608,547 | B1 |  | 8/2003  | Greier et al. |

(Continued)

FOREIGN PATENT DOCUMENTS

| DE | 29 46 753 | 5/1980 |
| DE | 31 34 584 | 3/1983 |

(Continued)

OTHER PUBLICATIONS

Japanese Office Action, Decision of Refusal in JP Patent Application No. 2008-535977, mailed on Feb. 10, 2011, 2 pages.

(Continued)

Primary Examiner — Eric Thomas
Assistant Examiner — Arun Ramaswamy
(74) Attorney, Agent, or Firm — Fish & Richardson P.C.

(57) ABSTRACT

An electrical component includes a ceramic base body. The ceramic base body includes several ceramic layers including a function layer and a composite layer bordering the function layer. The composite layer can include a zirconium oxide-glass filler mixture.

35 Claims, 13 Drawing Sheets

(56) References Cited

U.S. PATENT DOCUMENTS

| | | |
|---|---|---|
| 7,149,073 B2 | 12/2006 | Kirsten |
| 2002/0027282 A1 | 3/2002 | Kawakami et al. |
| 2004/0121897 A1 | 6/2004 | Seo et al. |
| 2006/0249758 A1* | 11/2006 | Feichtinger et al. .......... 257/246 |

FOREIGN PATENT DOCUMENTS

| | | |
|---|---|---|
| DE | 40 05 011 | 4/1991 |
| DE | 44 10 753 | 10/1994 |
| DE | 38 89 614 | 12/1994 |
| DE | 199 27 948 | 2/2000 |
| DE | 198 55 603 | 10/2000 |
| DE | 199 31 056 | 1/2001 |
| DE | 101 30 893 | 1/2003 |
| DE | 101 36 545 | 2/2003 |
| DE | 103 13 891 | 10/2004 |
| DE | 102004005664 | 9/2005 |
| DE | 102004005664 A1 * | 9/2005 |
| EP | 0 312 817 | 4/1989 |
| JP | 54-26710 | 2/1979 |
| JP | 58-27643 | 2/1983 |
| JP | 62-172137 | 7/1987 |
| JP | 01-179741 | 7/1989 |
| JP | 9-35909 | 7/1997 |
| JP | 10-289822 | 10/1998 |
| JP | 10-335115 | 12/1998 |
| JP | 11-265807 | 9/1999 |
| JP | 2000-082605 | 3/2000 |
| JP | 2000-323346 | 11/2000 |
| JP | 200-345201 | 12/2000 |
| JP | 2001-167974 | 6/2001 |
| JP | 2001-351827 | 12/2001 |
| JP | 2003-124006 | 4/2003 |
| JP | 2005-050973 | 9/2004 |
| JP | 2004-253757 | 2/2005 |
| JP | 2005-252039 | 9/2005 |
| WO | WO2004/086432 | 10/2004 |
| WO | WO 2004086432 A1 * | 10/2004 |

OTHER PUBLICATIONS

International Search Report for PCT/E2006/010148.
Written Opinion for PCT/E2006/010148.
English translation of Written Opinion for PCT/EP2006/010148.
Examination report from corresponding JP application 2008-535977.
Search report dated Nov. 24, 2009 from corresponding EP application 09163271.1.
Authorized officer Stefan Plutzer, European Search Report in European Application No. 1018392.2, dated Jul. 2, 2012, 4 pages (English translation unavailable).
Notification of Reasons for Refusal (English Translation, JP Pat. Appl. No. 2011-130193, mailed Oct. 19, 2012, 7 pages.

* cited by examiner

Key:  1   GA (wt%)

ELECTRICAL COMPONENT

CROSS REFERENCE TO RELATED APPLICATIONS

Pursuant to 35 USC §120, this application claims the benefit of PCT/EP2006/010148 filed Oct. 20, 2006 which claims the benefit of German Patent Application No. 102005050638.0 filed Oct. 20, 2005. Each of these applications is incorporated by reference in its entirety.

TECHNICAL FIELD

An electrical component with ceramic layers made of different materials is described, as well as an electrical component module with a single ceramic base body, in which several sets of electrodes are arranged.

BACKGROUND

From DE 19931056B4, a multilayer varistor with internal electrodes is known, that has low capacitance.

From DE 10136545B4, a ceramic multilayer capacitor with internal electrodes is known.

SUMMARY

One problem to be solved lies in providing an electrical component whose base body contains several ceramic materials and can be sintered to form a monolithic body.

The problem is solved by an electrical component, which comprises a ceramic base body with several ceramic layers, wherein a function layer borders a composite layer, and the composite layer contains a zirconium oxide-glass filler mixture.

The electrical component operates preferably passively, by receiving only one signal magnitude, whereby with an applied voltage, a corresponding current is generated, or vice versa. An auxiliary power supply, for example in the form of a current supply, is not needed.

The composite layer preferably serves as a passivation or insulation and/or electrical insulation layer. Here, it can protect the function layer from external influences. If contacting means are contained in the composite layer, then the coupling capacitances between them can be reduced by the insulation property of the composite layer.

The composite layer also acts as a means for reducing or adjusting the parasitic capacitance of the function layer, by which means its influence on the printed circuit board on which the component is mounted can be reduced or adjusted.

It is advantageous for the composite layer to contain zirconium oxide since this material reacts poorly with other materials, for example those of the function layer, and therefore the electrical properties of the electrical component after the sintering together of the different layers can be adjusted or clearly predicted. As a result, the adjustment of the electrical characteristic curve of the component is facilitated. By means of the glass filler-containing composite layer, the formation of irregularities in the interface region with the function layer, such as the formation of cracks, is reduced, so that also for this reason the adjustment of the electrical characteristic curve of the component is facilitated.

The glass filler of the composite layer preferably contains zinc borosilicate (Zn—B—Si) or aluminum silicate.

The function layer contains a function ceramic and preferably has a higher dielectric constant than the composite layer. The function ceramic can contain a varistor, capacitor, NTC or PTC ceramic.

It is preferred that ZnO be used as the main component of a varistor ceramic. However, SiC can also be used. As a varistor, the electrical component is preferably used for voltage stabilization, transient voltage limitation as well as for surge protection.

Preferably, the capacitor ceramic primarily contains inorganic, nonmetallic or polycrystalline substances, such as $TiO_2$ (COG) or ferroelectric $BaTiO_3$ (X7R or Z5U), with or without barrier layers. As a capacitor, particularly a ceramic multilayer capacitor, the electrical component can be used, for example, in measurement and control technology, data technology, communications technology, in switched-mode power supplies, and in motor vehicle electronics.

As the main component of an NTC ceramic, it is preferred that $Fe_3O_4$, $Fe_2O_3$, NiO or CoO be used. An electrical component with a function layer of NTC ceramic is preferably used as the detector of a temperature sensor. Alternatively, it can be used for flow rate adjustment as well as for protection and compensation tasks.

As the main component of a PTC ceramic, it is preferred that $BaTiO_3$ or $SrTiO_3$ be used. An electrical component with a function layer of PTC ceramic is preferably used as part of a temperature sensor, thermostat, or for current stabilization.

The composite layer as well as the function layer can be mixed with organic binders to produce a slurry which can later be processed to form green films. The binder can be removed during the sintering of the layers to each other.

It is advantageous for the composite layer to present a lower dielectric constant than the function layer, which keeps the stray capacitance in the area of the composite layer as low as possible.

According to one embodiment of the electrical component, the function layer and composite layers are stacked alternately one on top of another. Here, the composite layers can form both the top and bottom parts of the component, so that the top and bottom function layers are each covered by a composite layer.

According to another embodiment of the electrical component, at least one internal electrode is arranged in or on the function layer. It is advantageous to provide internal electrodes in the component so that a particularly precise adjustment of the capacitance or the resistance of the component can be achieved.

Several internal electrodes can be connected by means of a contacting means to an external contact on the surface of the base body. An example of a contacting means here is a through-contact or a wire made of an electrically conductive material. It is advantageous for the contacting means to be fillable with a metal-containing material. Here, a continuous hole may be present in the ceramic materials, which is filled with a metal, or a via structure may be present, which is fillable with a metal.

According to another embodiment of the electrical component, at least one set of electrodes, consisting of at least two internal electrodes, is arranged in or on the function layer. A set of electrodes denotes an arrangement of several electrodes, together fulfilling a common function, such as the generation of an electric field in or on a dielectric. It can be a stack of several interconnected electrodes to which the same potential can be applied.

It is advantageous for the two internal electrodes to face each other and for the space between them to be filled with the material of the function layer. Several such sets of internal electrodes can be arranged next to each other in or on the function layer. The electrodes of each set can be made to contact each other by means of the contacting means. In this way, the capacitance and resistance of the component can also be adjusted particularly precisely. With such a structure, the function layer can contain a varistor ceramic so that the electrical component forms a varistor.

In addition, an electrical component module with a ceramic base body is proposed, which contains a ceramic function layer and a ceramic composite layer of the type described above and below, as well as several sets of internal electrodes. The sets of internal electrodes are arranged jointly in a single, monolithic ceramic base body next to each other. Each set of internal electrodes is preferably connected to the external connection assigned to it, and together with its associated external connection and the ceramic base body it forms an electrical component. Due to the arrangement of a plurality of such electrical components in a single, common base body, the resulting component can be called a component module.

It is preferable for the function and composite layers of the electrical component module to border each other. Here, they can be stacked one on top of the other.

According to one embodiment of the electrical component module, the composite layer can contain a zirconium oxide-glass filler mixture, so that a particularly good joint sintering with the function layer can be achieved.

According to one embodiment, a capacitor is formed between two internal electrodes with differing electric potentials in the plane of the electrical component. If the internal electrodes are arranged within the function layer which contains a varistor ceramic, a varistor section is formed between the internal electrodes. In particular, the section may be a varistor section between a ground electrode and an internal electrode, which receives a signal that has been applied to the electrical component via an external contact. A ground electrode of a function layer can be capacitively coupled to another internal electrode of the same layer. Each of the internal electrodes can in general function as a signal line.

According to one embodiment, an internal electrode of a function layer has a leg that faces an internal electrode that is adjacent to it, wherein the separation and thus the capacitance between the two internal electrodes in an area can be minimized. This occurs in the case of a given separation between the external contacts, which are in contact with the corresponding internal electrodes. Without changing the external structure of the electrical component or the conditions of contact to a printed circuit board, lower capacitance can be achieved between the internal electrodes of the function layer without having to change the separations between the external contacts.

According to a preferred embodiment of the electrical component, the internal electrodes of the function layer run partially into the interior of the electrical component and are connected at only one end to an external contact. Internal electrodes of different electrical potentials of the same function layer are here preferably adjusted to each other with regard to their dimensions. For example, a ground electrode of a function layer does not run deeper, or at least only slightly deeper or less deep, into the interior of the electrical component than an internal electrode of another electrical potential, which is adjacent to said ground electrode.

According to one embodiment of the electrical component, the composite layer also comprises an internal electrode. This has the advantage that the internal electrode generates low stray capacitances, while being capable of carrying currents that are carried by the internal electrodes of the function layer. In addition, this allows a reduction of the coupling capacitances.

Moreover, at least one internal electrode of the composite layer can function as a signal line, where it could be a ground electrode or a ground line which is connected to the same potential, such as a ground electrode of the function layer. The at least one internal electrode of the composite layer can advantageously reduce the coupling capacitance between two internal electrodes of the function layer. In particular, according to one embodiment of the electrical component, the at least one internal electrode of the composite layer can reduce the coupling capacitance between a ground electrode and another internal electrode of the function layer.

According to one embodiment of the electrical component, the internal electrode completely crosses the composite layer and is connected at each end to an external contact.

Each internal electrode of the electrical component, regardless of whether it is an internal electrode that is connected to or integrated in the function layer or a composite layer, can have one of the following shapes: square, rectangular, T-shaped, L-shaped, curved, meandering. It is preferred that a shape be chosen which allows the mutual approach of internal electrodes inside the function layer, thus reducing the capacitance between them. For example, it is advantageous for an L-shaped internal electrode to face with one of its legs an adjacent internal electrode in the same layer. Other internal electrode shapes employable for this purpose can, however, also be used without limitation.

According to one embodiment of the electrical component, several internal electrodes of a function layer and/or of a composite layer are shaped identically and form a mirror-symmetrical arrangement relative to each other.

It is advantageous for the function layer and/or the composite layer to be doped, such as to allow an exact adjustment of the electrical characteristic values.

The embodiments of electrical components described here are suitable particularly as electrical filters, for example, for use in computer housings or in cellular telephones and/or as electrical protection devices for protecting against transient voltage and/or overvoltages for electronic apparatuses.

DESCRIPTION OF THE DRAWINGS

The described objects are explained in greater detail using the following figures and embodiment examples. In the drawing.

Figure 1:
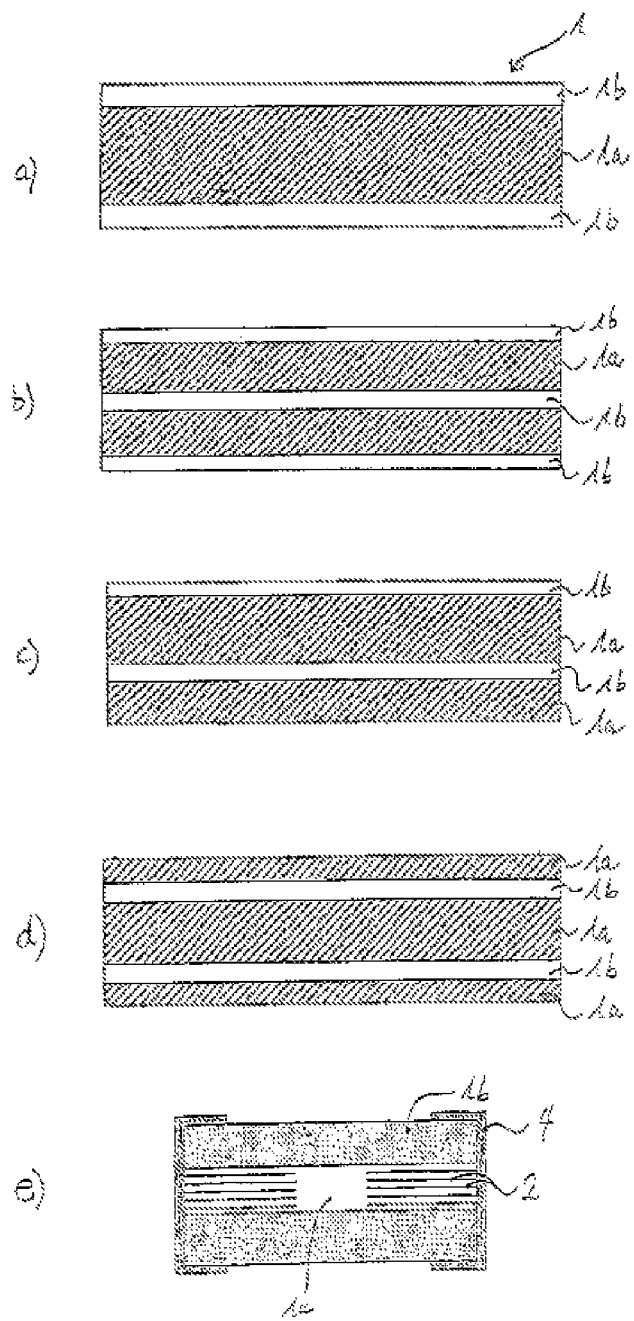
FIGS. 1a-1d show different layer structures of a ceramic base body.
FIG. 1e shows an electrical component with a ceramic base body according to one of FIGS. 1a-1d, particularly according to FIG. 1a, with integrated internal electrodes.

It was discovered that there was a great difference between the sintering temperature and the sintering shrinkage of zinc oxide and other nonmetallic, inorganic ceramic materials, such as zirconium oxide ($ZrO_2$—also called zirconium dioxide), and that this difference made it difficult to sinter these ceramic materials together.

It was also discovered that the above mentioned effects could be avoided or at least decreased by enriching the zirconium oxide with a glass filler component. Here, a glass filler component in a proportion of 5-30 wt % was admixed with the zirconium oxide, which resulted in the formation of an adhesive area between the two layers, and allowed the sintering together of the two ceramic materials or layers.

DETAILED DESCRIPTION

During the sintering process, the admixed glass filler component also adds as a buffer layer that compensates for the differing expansions of the ceramics. It was observed that:

(a) at high temperatures during the sintering process, the liquefied glass fills gaps between the different materials. This leads to a glass intermediate layer between the composite layer and the function layer. As a result, the formation or maintenance of cavities is suppressed or prevented, so that the electrical characteristic curves of the base body are not adversely affected. Because the glass is still plastic at higher temperatures, it is capable of reducing tensions between the layers by deformation.

(b) at moderate temperatures, the glass is sufficiently plastic to allow the formation of a sliding plane between the different layers. As a result, a mechanical means for tension reduction between the layers during the sintering process is created.

(c) at low temperatures during the cooling process of the base body after the sintering, the glass is so stable that no cracks occur in the composite layer.

The composite layer with a lower dielectric constant lowers the stray capacitance of the base body.

A composite layer is proposed which represents a mixture of a glass filler component and zirconium oxide, where glass is present in a proportion of preferably 5-30 wt %. The remaining portion must be assigned for the most part to zirconium oxide and to a lesser extent to organic material. Depending on the application and the desired capacitance or conductivity, this layer can be doped with Mg, Sb, B or Al.

The glass filler component contains preferably zinc borosilicate or aluminum silicate. It was found that these silicates present good compatibility with zirconium oxide and with zinc oxide, and consequently do not influence, or influence only slightly, by chemical reaction the electrical properties of the composite and function layers. However, the following materials or composition can also be used: $Na_2O.Al_2O_3.B_2O_3.SiO_2$, $Na_2O.BaO.SiO_2$, $ZnO.B_2O_3.SiO_2$, $SiO_2.BaO.B_2O_3$, $Bi_2O_3.B_2O_3$, $B_2O_3.ZnO.Bi_2O_3$, $B_2O_3.ZnO$, $SiO_2.B_2O_3.ZnO$, $B_2O_3.ZnO$, $SiO_2.B_2O_3.ZnO$.

Based on its composition with zirconium oxide, the composite layer has a particularly high thermal resistance. Thus, the use of such a composite layer has the advantage that the varistor does not burst when surge currents or a high voltage are/is applied to it, which abruptly heat the varistor. This applies particularly if the composite layer is embodied as the cover layer of a base body.

The function ceramic, on the other hand, can comprise a varistor ceramic, which results in the base body becoming the base body of a varistor. The varistor ceramic preferably contains zinc oxide, and it can be doped with such dopants as Bi, Pr or Sb, for example, to increase or to lower the permittivity of the varistor ceramic. However, the function ceramic can also contain another material that would be suitable, for example, for a ceramic multilayer capacitor or for an NTC or PTC element.

FIGS. 1a-1d show a base body 1 of an electrical component in which a first layer 1a is a function layer that contains a function ceramic, and in each case the top and bottom sides border a composite layer 1b, which preferably has a lower dielectric constant than the first layer. The composite layer is preferably a passivation layer. The different layers are arranged alternately one on top of another and together form a sandwiched structure.

FIG. 1a shows how the function layer 1a is arranged between two layers of lower dielectric constant.

FIG. 1b shows a base body with two function layers 1a, the top and bottom sides of each of which border a composite layer 1b of lower dielectric constant.

FIG. 1c shows the base body according to FIG. 1b, but with the lowermost composite layer 1b omitted so that a function layer 1a instead forms the bottom of the base body.

FIG. 1d shows a base body in which the top and bottom sides of two composite layers 1b each border a function layer 1a. Here the function layers in each case form the top and bottom of the base body.

FIG. 1e shows a ceramic base body which is provided with external contacts 4 that cover its side flanks. Such an external contact 4 can be applied in the same way to the base bodies shown in FIGS. 1a-1d. Besides the external contacts 4, electrodes 2 can be arranged in each base body. Here it is preferred for the input lines or the electrodes to be embedded in a function layer 1a. However, it is also possible to arrange the input lines at least partially in the composite layer 1b, in which the coupling capacitances can be kept low as a result of the insulation property of the composite layer between several input lines.

The manufacturing process of the base body preferably takes place as follows:

1. For the composite layer, a mixture of preferably doped zirconium oxide is prepared, most advantageously in the form of a powdered composition. This mixture then receives the admixture of a glass filler in a proportion of 5-70 wt %, preferably in a proportion of 5-30 wt %. For the function layer, a preferably doped ceramic mixture made of zinc oxide or another suitable material can likewise be prepared.

2. The powder compositions are shaped by means of a binder to green films with minimum required cohesion, and then dried. The binder can here contain water and organic material.

3. The dried green films, as needed, are stacked one on top of another to obtain a multilayered green base body.

4. If necessary, electrodes and contacting means are printed onto the ceramic layers or introduced into the ceramic layers. It is preferred that the electrodes be applied onto the desired layers with the thin layer technique, or screen printing in stacks, or with comb-like interdigitation. Suitable electrode materials are, for example, nickel or copper.

5. The green body is sintered in a reduced or unreduced atmosphere, where the binder, particularly its organic components, evaporates. As a result of the sintering process, the glass filler component forms a buffer layer between the different ceramic layers, so that they can be sintered to each other without the formation of cracks.

5a. During the sintering of the green base body (with or without electrodes or contacting means), the following first profile can be used, where organic components of the ceramic layers can be evaporated:
  the heating of the green base body to 100° C. in steps of 5° C. per min,
  further heating to 450° C. in steps of 0.2-0.5° C. per min,
  further heating to 880° C. in steps of 5-10° C. per min,
  maintenance at 880° C. for 15 min to 1 h,
  cooling of the base body to −5 to −15° C. of room temperature.

5b. For a subsequent sintering process, the following second profile can be used, in which the ceramic layers of the base body are sintered jointly:
  heating of the green base body to 1000-1100° C. in steps of 1-4° C. per min.
  maintenance at 1000-1100° C. for 180-240 min,
  cooling of the base body at −1 to −4° C. to room temperature.

5c. The sinter profiles can be selected as a function of the melting temperature of the electrodes or contacting means optionally present in the base body. Here it is preferred to choose a sintering temperature which is below the melting temperature of the electrodes or contacting means.

6. The sintered base body thus obtained is preferably provided over a large surface area with a metal external contacting layer. However, this step can also be carried out after the separation of the base body (step 7).

7. Depending on the application, the sintered base body can be separated, before or after it has received an external contact layer. For example, the base body is separated according to a grid defined by units of several adjacently arranged electrode stacks. After the separation, the result would be modules consisting of several sets of internal electrodes, where the sets of internal electrodes each would perform together with an external contact the function of an individual electrical component, for example, a varistor. If it has not yet received an external contact in the previous step, such a module can now receive an external contact with the desired pattern.

Figure 2:
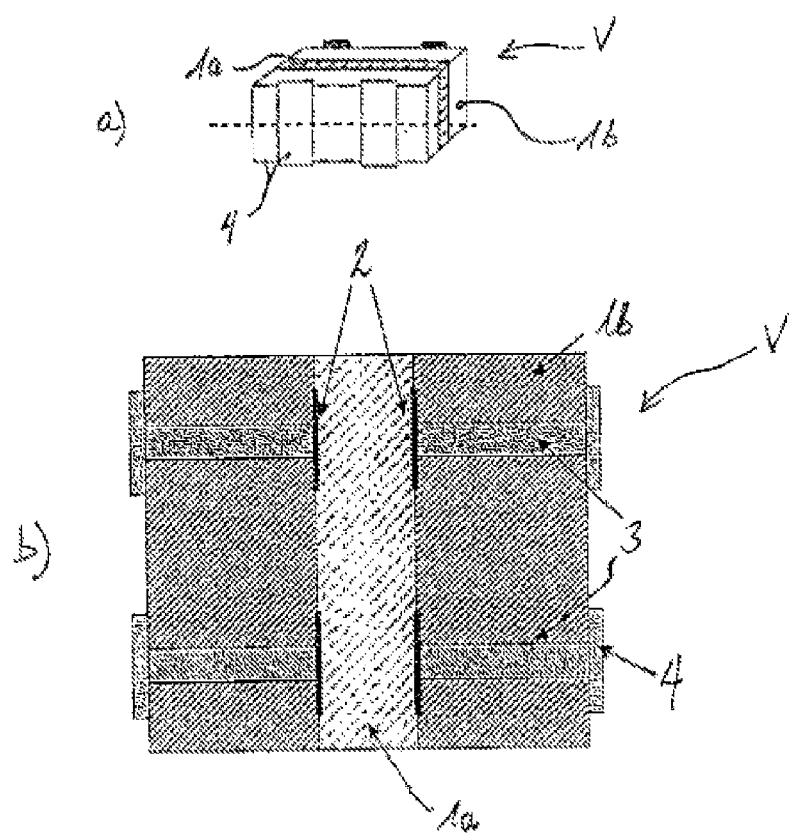
FIGS. 2a and 2b show different perspectives of a varistor.

FIG. 2a shows a perspective view of a varistor V with two external contacts 4 and a monolithic ceramic base body 1, which consists of different ceramic layers 1a and 1b. The varistor is preferably an SMD varistor with low capacitance of less than 1 pF.

A plan view through the plane indicated by the broken line of this varistor V is shown in FIG. 2b. Several, preferably four, internal electrodes 2 are arranged in the function layer 1a, which can be contacted by means of contacting means 3 with the appropriate external contacts 4 assigned to these electrodes.

The aforementioned four internal electrodes 2 are preferably connected on one side by a surface to the composite layer 1b, while being embedded on the other side in the function layer 1a. In this way, two pairs of internal electrodes 2 are arranged in the base body, where, for each pair, a first internal electrode faces the second internal electrode, and the space between these internal electrodes of an internal electrode pair is filled with the function layer 1a.

However, additional internal electrodes can be arranged within the function layer, so that several sets of internal electrodes with more than two internal electrodes per set are formed. The internal electrodes of a set can here be connected to each other by means of the contacting means 3.

An example of a contacting means for contacting one or more internal electrodes to an external contact would be a metallic through-contact 3, which can be filled preferably with silver, silver-palladium, silver-platinum, or simply platinum. Each through-contact passes here at least partially through the composite layer 1b, so that the coupling capacitances can be considerably reduced with several through-contacts in the component.

Figure 3:
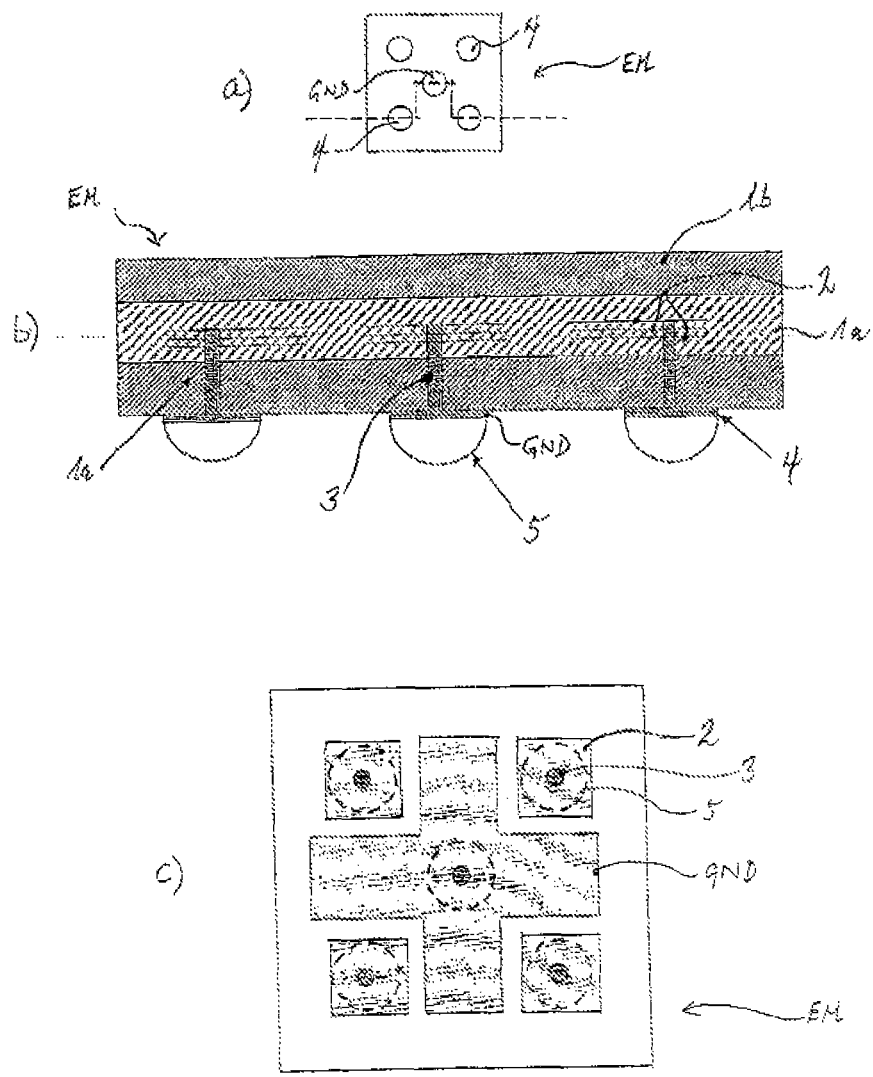
FIGS. 3a-3c show different perspectives of an electrical component module.

FIGS. 3a-3c show together an electrical component module from different perspectives. The component module comprises a ceramic base body, which presents several ceramic layers made up of different materials, beneath which a function layer comes in contact with a composite layer, and several sets of internal electrodes are arranged next to each other in the common ceramic base body. It is preferred that the composite layer have a lower dielectric constant than the function layer, and that the composite layer contain a zirconium oxide-glass filler mixture, so that the ceramic base body can be sintered particularly well to form a monolithic body.

If a varistor ceramic is used as the function layer, then the electrical component module can be called a varistor module. The same applies to the use of the alternative ceramic materials mentioned in the introduction.

FIG. 3a shows how the surface of a base body is provided with external contacts 4 in a regular, preferably rectangular, arrangement. The surface is preferably the underside of the base body that will face the printed circuit board when the component is mounted on a board. A common ground contact GND is also arranged on the aforementioned surface of the base body, in the center of the arrangement of external contacts. Each external contact can be provided with a ball of solder 5.

FIG. 3b shows a cross section of the electrical component module EM, which is shown in the top view in FIG. 3a, where the cross section corresponds to the course of the broken, stepped line shown in FIG. 3a. With each external contact 4 or GND, a through-contact 3, which preferably passes partially through the composite layer 1b, is connected, which itself contacts one or more internal electrodes 2. The latter can be connected to each other by means of the through-contact. Several sets of internal electrodes, each consisting of three internal electrodes 2, are shown, where the individual internal electrodes are embedded in a single function layer 1a. Each set of internal electrodes, whose internal electrodes are contacted by means of a through-contact 3 to an external contact 4, forms, together with the ceramic layers, an electrical component, so that several electrical components can be arranged next to each other in a common base body. If here the function layer contains a varistor ceramic, then a varistor module can be devised. If, alternatively, a capacitor ceramic is used as function layer, the sets of internal electrodes mutually overlap in a comb-like fashion with their individual internal electrodes and are oppositely charged, a ceramic multilayer capacitor can be devised. Here, several sets of overlapping internal electrodes, which are connected to an external contact either directly or indirectly via a contacting means, together with the ceramic base body, can produce an arrangement of several capacitors, which are combined into one ceramic capacitor module.

Thus, in the varistor module or capacitor module, a total of 5 varistors or capacitors is contained with a common, monolithic base body, where a varistor or capacitor presents an external contact in the form of a ground GND common to all the varistors or capacitors.

FIG. 3c shows a top view through the electrical component module EM. A cross-shaped external connection for the ground GND is shown, which is arranged on the underside of the component module. On the same underside, besides this cross-shaped ground electrode GND, the external contacts 4 (together with the solder balls 5) of the varistors or capacitors are arranged symmetrically. The broken-line circles in the figure indicate the contours of the solder balls 5, the four squares show the cross sections of the internal electrodes 2, and the filled, smaller circles the cross section of the through-contact 3 of each varistor or capacitor. Because the external contacts 4 present a cross section which is congruent with that of the solder balls, the external contacts are not represented in this figure.

Figure 4:
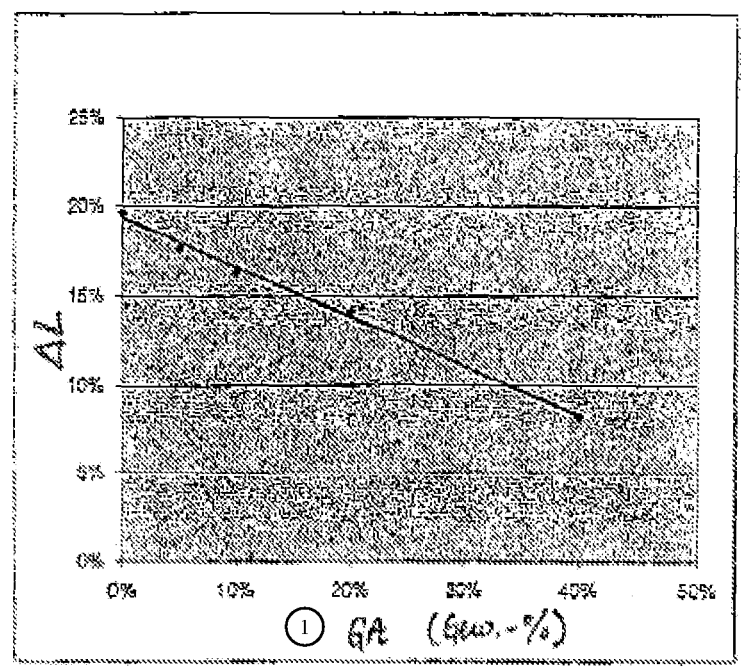
FIG. 4 shows a graph for the representation of the sintering shrinkage of a varistor as a function of the glass content of the base body.

FIG. 4 shows a graph representing the sintering shrinkage $\Delta L$ of a multilayered ceramic base body with two composite layers and an intermediate function layer as a function of the glass filler proportion GA in the composite layer 1b. Without the addition of glass filler in the composite layer, the sintering of the ceramic base body results in sintering shrinkage, which is measured by using the enlargement produced by the lateral expansion of the base body, and is approximately 20%. The sintering shrinkage decreases approximately linearly as the amount of glass filler mixed with the composite layer is increased. With a glass filler content of 40 wt %, the sintering shrinkage of the ceramic base body was only approximately 9%.

Figure 5:
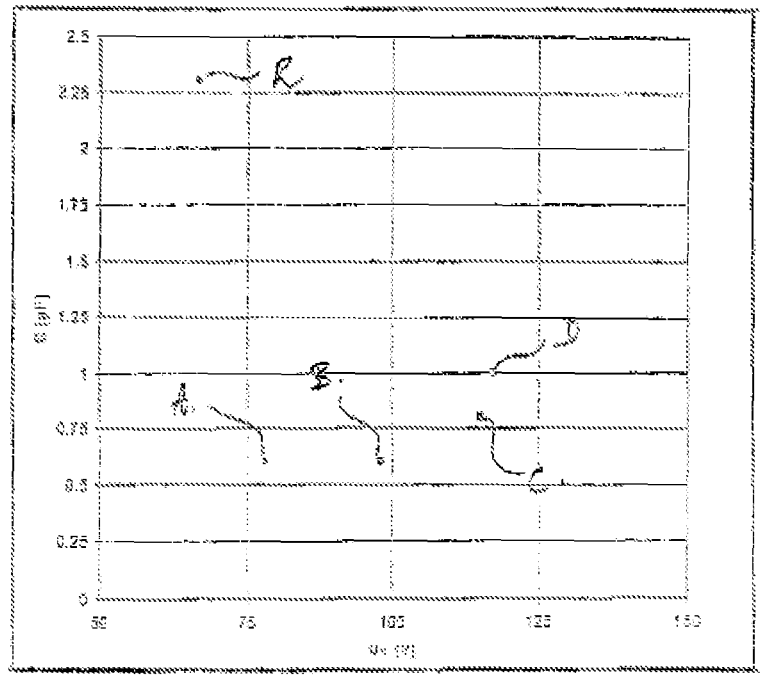
FIG. 5 shows a graph for the representation of the reduction of the capacitance of a varistor as a function of the glass content of the base body.

FIG. 5 shows a schematic graph representing a comparison of the capacitance of several varistors A to D with different glass filler proportions in a zirconium oxide-containing composite layer (Z-G value) in contrast to the reference varistor R without glass filler. All the ceramic bodies of the varistors were sintered at approximately 1000° C. The varistors each present an electrode stack, where different varistors with different electrode separations were tested. These separations decreased after the sintering of the ceramic base body by up to 0.4 mm. If initially the separation between the electrodes was thus, for example, 0.12 mm, then the actual separation after sintering can be approximately 0.08 mm.

For the reference varistor R, the Z-G value is 0%. Its capacitance at a voltage of approximately 68 V is 2.3 pF.

For the varistor A, the Z-G value is 60%, so that its capacitance is approximately 0.6 pF.

For the varistor B, the Z-G value is 40%, so that its capacitance with unchanged voltage conditions is also approximately 0.6 pF.

For the varistor C, the Z-G value is 20%. At a voltage of approximately 115 V, it has a capacitance of approximately 0.78 pF.

For the varistor D, the Z-G value is 5%. At a voltage of approximately 116 V, it has a capacitance of approximately 1 pF.

In general, it can be seen that the capacitance decreases with increasing amounts of filler in the zirconium mixture.

In the context of this document, particularly with regard to all the aforementioned embodiments of the electrical component, the function layers can be doped with, for example, Bi, Pr or Sb. Here, a ceramic of the function layer, for example, a varistor ceramic, can be doped with these materials. Composite layers can also be doped with Mg, Sb, B or Al, for example. Here, the zirconium oxide-glass mixture can be doped specifically with these materials.

Figure 6:
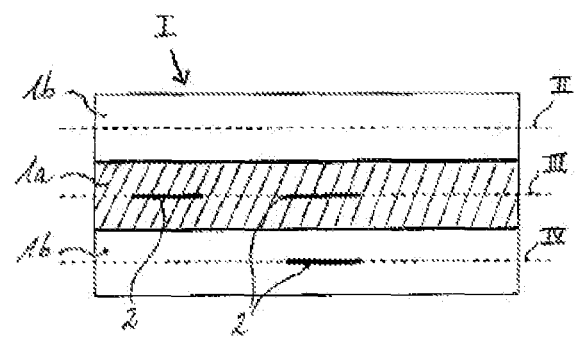
FIGS. 6, 8, 9, 10 show cross sections of a first electrical component.
Figure 9:
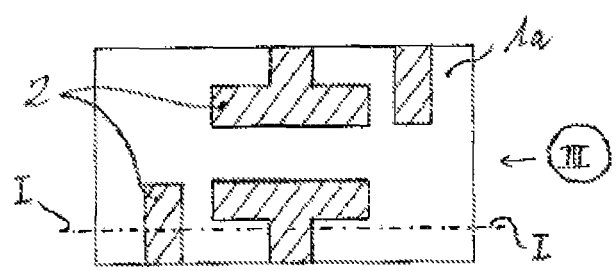

FIG. 6 shows a cross section of an electrical component 1 through section I (whose position is shown in FIG. 9). The cross section shows several, in particular 3, layers of different composition in a mutually superimposed, laminated or stacked arrangement. The planes II, III and IV are shown, where the plane II is located in an uppermost composite layer 1b, the plane III in a middle function layer 1a, and the plane IV in a bottommost, second composite layer 1b. Cross sections of two internal electrodes 2 located in a plane within the function layer 1a are shown, and a cross section of an internal electrode within the bottommost composite layer 1b is shown. At least a part of the internal electrodes 2 of the bottommost composite layer 1b is, in an orthogonal projection, directly under the middle internal electrode 2 of the function layer 1a.

Figure 7:
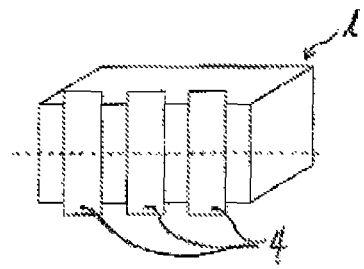
FIGS. 7, 12, 17, 22, 27 show perspective representations of different electrical components in the form of monolithically constructed arrays with several external contacts.

FIG. 7 is a perspective representation of an electrical component; some of its cross sections are shown in FIGS. 6, 8, 9 and 10. On a lateral surface, or on a side surface of the electrical component, the arrangement of several external contacts 4, particularly 3 external contacts, is shown. The latter can each contact several, particularly also mutually superimposed internal electrodes at the same electrical potential. The same number of external contacts can be arranged on the opposing side surface of the electrical component. It is also possible for external contacts to be arranged on a front surface that runs perpendicularly with respect to the side surface with the shown external contacts.

Figure 8:
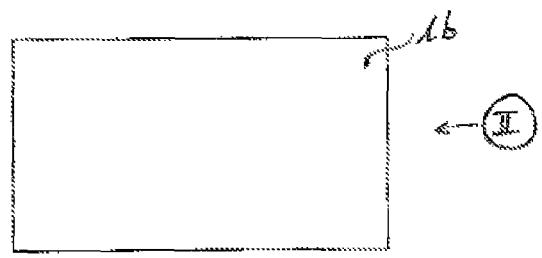

FIG. 8 shows the plane II, which was presented with FIG. 6, of the uppermost composite layer 1b, with no internal electrodes. The composite layer consists of a zirconium oxide-glass filler mixture.

FIG. 9 shows the plane III, which was presented with FIG. 6, of the functional layer 1a, showing the surface extents or geometries of the internal electrodes 2 located in this layer in the plane III. Two T-shaped internal electrodes face each other symmetrically, where a first axis of symmetry runs between these internal electrodes along their front surfaces and a second axis of symmetry runs through the legs of each T-shaped internal electrode. The base end of a leg of each T-shaped internal electrode approaches the surface of the electrical component or of the function layer, and it can therefore be or is contacted to an external contact, for example, as shown in FIG. 7. The T-shaped electrodes are designed as ground electrodes or as ground lines that are connected to ground, and capable of diverting signals at certain frequencies. Next to each T-shaped internal electrodes, a longitudinal, rectangular internal electrode is arranged, whose one end approaches the surface of the electrical component and can be contacted to an external contact 4. The other end of the internal electrode faces the interior of the component and ends there. The length of the internal electrode corresponds to the length of the T-shaped electrode. The rectangular internal electrodes are designed as signal lines to carry signals, for example, radio signals, and are each capacitively coupled to the ground electrode arranged next to it, whose function as signal diverting device is activated above a certain activation current or activation voltage. If the function layer presents a varistor ceramic of the described type, a varistor section is generated between each T-shaped ground electrode and a rectangular internal electrode located adjacent to it in the same the plane. The varistor section makes it possible, for example, to shunt surge currents or overvoltages, and signals below, within, or above a certain frequency range, in a controlled way, and divert them away from the ground electrodes.

Owing to its T-shaped form, the coupling capacitance between this internal electrode and the adjacent, longitudinal rectangular internal electrodes in the same plane, can be reduced. However, instead of the T-shape, other shapes are also conceivable, particularly those which allow a reduction of the separations between the boundaries of adjacent internal electrodes at different potential within a plane. An L-shape is possible here.

Figure 10:
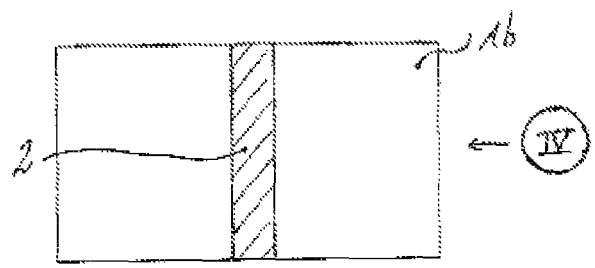

FIG. 10 shows the plane IV, which was presented in FIG. 6, of the bottommost composite layer 1b. This composite layer has an internal electrode 2, which passes as signal line or ground line, transversely through the plane IV and is connected at each of its ends to an external contact 4. Here, the same external contacts are contacted, which are connected to the T-shaped internal electrodes 2 of the function layer 1a. A current carried by the T-shaped internal electrodes of the function layer is thus also carried by the ground line of the bottommost composite layer 1b with lower stray capacitance.

Figure 11:
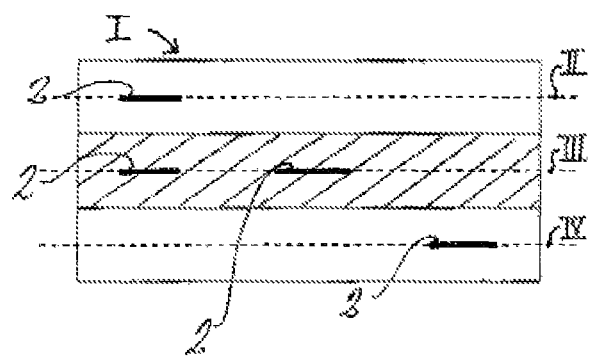
FIGS. 11, 13, 14, 15 show cross sections of a second electrical component.
Figure 14:
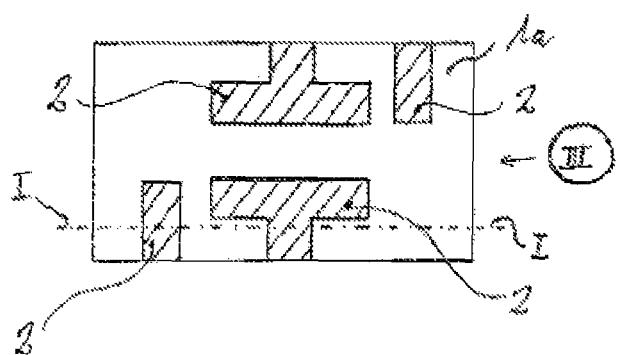

FIG. 11 shows a cross section of another electrical component 1 through a section I (whose position is shown in FIG. 14). The cross section shows several, particularly 3, layers of different composition in a mutually superimposed laminated or stacked arrangement. The planes II, III and IV are shown, where the plane II is located in an uppermost composite layer 1b, the plane III is in a middle function layer 1a, and the plane IV in a bottommost, second composite layer 1b. Cross sections of two internal electrodes 2 located in a plane within the function layer 1a, a cross section of an internal electrode 2 within the uppermost composite layer 1a as well as a cross section of an internal electrode 2 of a bottommost composite layer 1b are shown. At least a part of the internal electrodes 2 of the uppermost composite layer 1b lies, in an orthogonal projection, directly under the left, rectangular internal electrode 2 of the function layer 1a. At least a part of the internal electrodes 2 of the bottommost composite layer 1b lies, in an orthogonal projection, directly under the right, rectangular internal electrode 2 of the function layer 1a.

Figure 12:
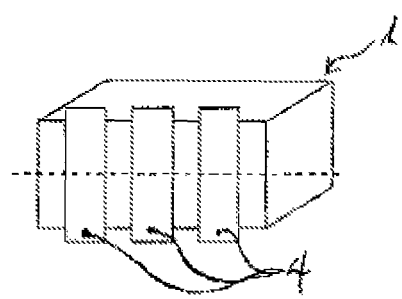

FIG. 12 is a perspective representation an electrical component, some of whose cross sections are shown in FIGS. 11, 13, 14 and 15. External contacts 4, as already described with reference to FIG. 7, can be formed.

Figure 13:
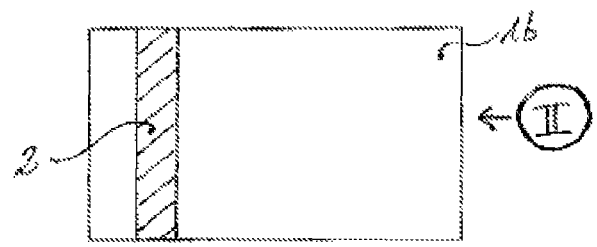

FIG. 13 shows the plane II, which was presented in FIG. 11, of the uppermost composite layer 1b, which presents an internal electrode or signal line 2 in its left half, which completely crosses the plane and is contacted at each end with an external contact 4 at the same electrical potential. The composite layer consists of a zirconium oxide-glass filler mixture.

FIG. 14 shows the plane III, which was presented with FIG. 11, of the function layer 1a. Again, two T-shaped internal electrodes face each other symmetrically in the way shown in FIG. 9 and the associated description. Here too, the T-shaped electrodes are designed as ground electrodes or as ground lines which are connected to ground and can divert signals at certain frequencies. Next to each T-shaped internal electrode, a longitudinal, rectangular internal electrode is arranged in a way that corresponds to FIG. 9 and to the associated description. The functions of the T-shaped internal electrodes, of the rectangular internal electrodes as well as of their interactions in the sense of signal diversion correspond to the description with reference to FIG. 9. The left internal electrode 2 of the function layer 1a, however, works together with the signal line 2 of the composite layer in such a way that a current carried with low stray capacitance through the left, rectangular internal electrode 2 of the function layer 1a, is also carried by the signal line of the function layer 1a.

Figure 15:
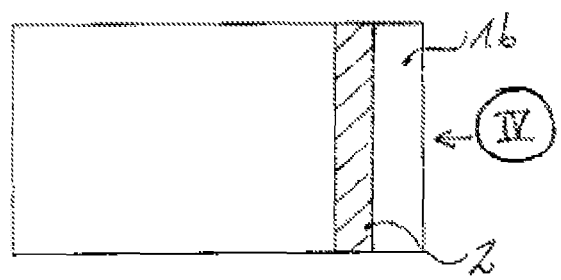

FIG. 15 shows the plane IV, which was shown in FIG. 11, of the bottommost composite layer 1b. The composite layer presents an internal electrode 2, which, as a signal line, crosses the plane IV and is connected at each end to an external contact 4. Here, one of the same external contacts is contacted, which is connected to the right internal electrode 2 of the function layer 1a. A current carried by the right, rectangular internal electrode 2 of the function layer 1a is thus also carried by the signal line of the bottommost composite layer 1b with low stray capacitance.

Figure 16:
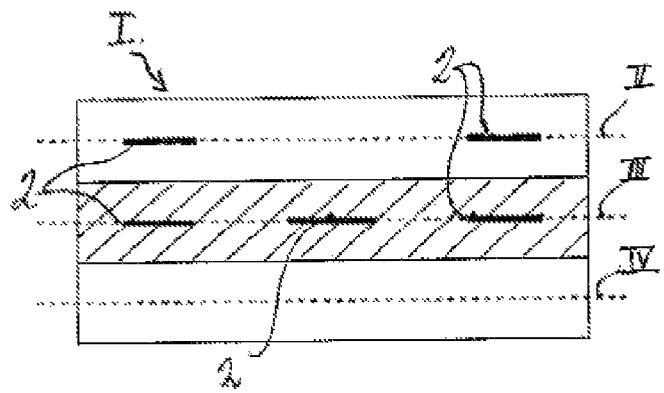
FIGS. 16, 18, 19, 20 show cross sections of a third electrical component.
Figure 19:
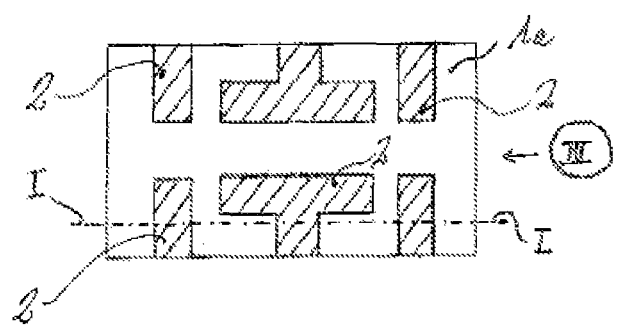

FIG. 16 shows a cross section of another electrical component 1 through a section I (whose position is shown in FIG. 19). Sections of three internal electrodes 2 located in a plane III within the function layer 1a as well as sections of two internal electrodes 2 within the uppermost composite layer 1b are shown. The bottommost composite layer 1b has no internal electrodes.

Figure 17:
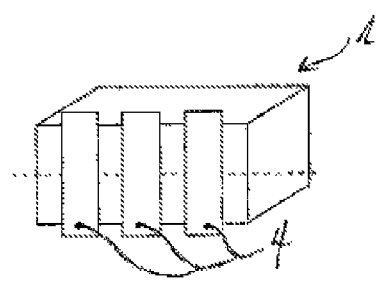

FIG. 17 is a perspective representation of an electrical component, some of whose cross sections are shown in FIGS. 16, 18, 19 and 20. The electrical component can be formed with external contacts 4, as already described in reference to FIG. 7.

Figure 18:
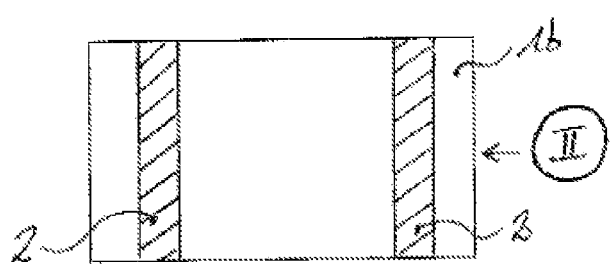

FIG. 18 shows the plane II, which was shown in FIG. 16, of the uppermost composite layer 1b, which in each case presents an internal electrode or a signal line 2 in a left and a right half. Both signal lines completely cross the plane and are connected at each end to an external contact 4 at the same electrical potential.

FIG. 19 shows the plane III, which was presented with FIG. 11, of the function layer 1a. Again, two T-shaped internal electrodes are in a mirror symmetrical arrangement opposite each other in a way corresponding to FIG. 9 as well as the associated description. Here too, the T-shaped electrodes are designed as ground electrodes or as ground lines which are connected to ground and can divert signals at certain frequencies. Next to each T-shaped internal electrode, on both sides, a longitudinal, rectangular internal electrode is arranged. Here, rectangular internal electrodes arranged in the left half and in the right half of the plane are in a mirror symmetrical arrangement opposite each other. The functions of the T-shaped internal electrodes, of the rectangular internal electrodes as well as of their interactions in the sense of signal diversion correspond to the description of FIG. 9. In the case where the function layer presents a varistor ceramic, according to this embodiment example, however, two varistor sections are produced immediately on each side of a T-shaped ground electrode. As a result, not only is it possible to shunt higher voltage surges in a controlled way, but also several signals can be applied to the electrical component through a single side surface and at the same time be processed by it. Thus, a bidirectional construction is indicated. A current which is carried by two rectangular internal electrodes located in the left half is also carried by the signal line of the composite layer 1b, which is located at least partially, in an orthogonal projection, above the rectangular internal electrodes. The same applies to the internal electrodes in the right half of the plane III of the electrical component.

Figure 20:
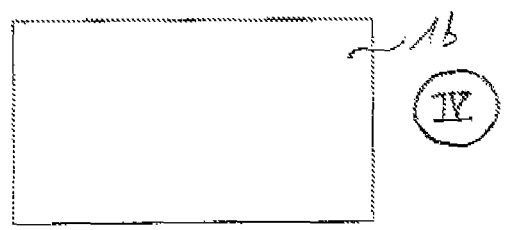

FIG. 20 shows a bottommost composite layer 1b of the electrical component without internal electrodes in the plane IV. The electrical component 1 could be mounted, for example, by means of the underside of this composite layer on a printed circuit board, which would make it more difficult for stray capacitances, with respect to the conductor plate or electromagnetic fields emitted by the conductor plate, to reach the active function layer or the active uppermost composite layer. Thus, the signals processed by the electrical component can be processed with less interference or the printed circuit board can be more effectively protected from the effects of voltage surges.

Figure 21:
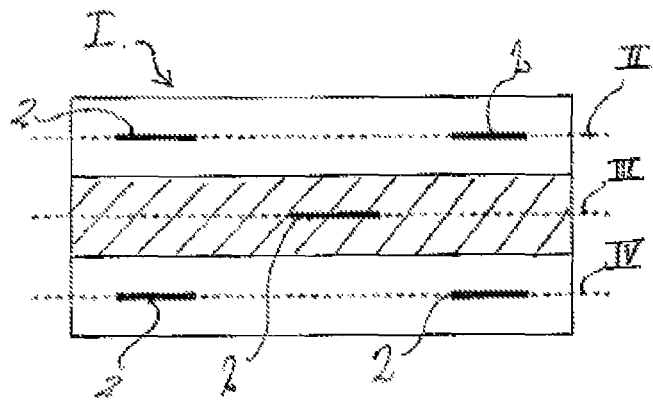
FIGS. 21, 23, 24, 25 show cross sections of a fourth electrical component.
Figure 24:
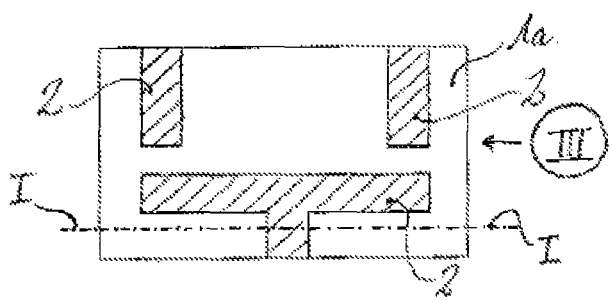

FIG. 21 shows a cross section of another electrical component 1 through a section I (whose position is shown in FIG. 24). A cross section of an internal electrode 2 located in the middle function layer 1a, cross sections of two internal electrodes 2 within the uppermost composite layer 1b as well as cross sections of two internal electrodes 2 of a bottommost composite layer 1b are shown.

Figure 22:
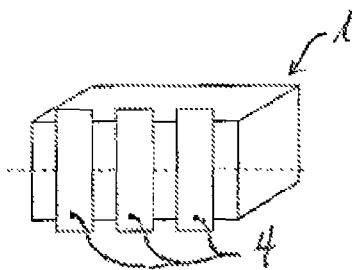

FIG. 22 is a perspective representation of an electrical component, some of whose cross sections are shown in FIGS. 21, 23, 24 and 25. External contacts 4, as already described in reference to FIG. 7, can be formed.

Figure 23:
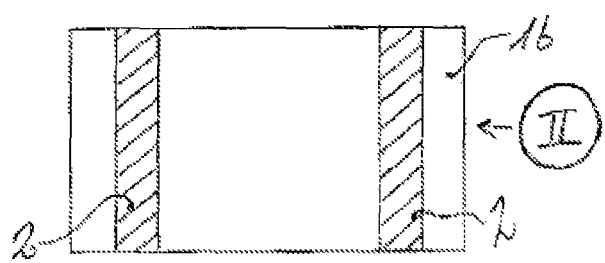

FIG. 23 shows the plane II, which was presented with FIG. 21, of the uppermost composite layer 1b, which in each case presents an internal electrode or a signal line 2 in a left and a right half. Both signal lines cross the plane completely and are contacted at each end to an external contact 4, which has the same electrical potential as the signal line connected to it.

FIG. 24 shows the plane III, which was shown in FIG. 21, of the function layer 1a. A T-shaped internal electrode 2 in the form of a ground electrode or ground line is shown, which presents a stem, whose end leads to an external contact 4 at a side surface of the electrical component for electrical contacting. Opposite the branch of the T-shaped ground electrode, which runs perpendicularly to the stem, at a separation, two rectangular internal electrodes are arranged, which are each contacted at one end to an external contact which is arranged on the side surface of the electrical component, which faces the external contact connected to the ground electrode. The rectangular internal electrodes are here at least partially, in an orthogonal projection, beneath the signal lines of the uppermost composite layer 1b, which are arranged on the corresponding side halves. The functions of the T-shaped internal electrodes, of the rectangular internal electrodes as well as their interactions in the sense of signal diversion correspond to the description associated with FIG. 9. In this case, two capacitive areas are formed between the one ground electrode and the rectangular internal electrode of the function layer.

Figure 25:
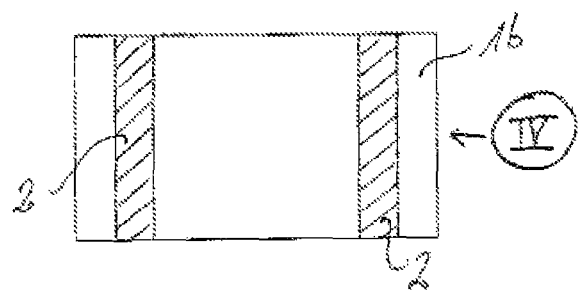

FIG. 25 shows the plane IV, which was shown in FIG. 21, of the bottommost composite layer 1b. The latter is designed as the uppermost composite layer 1b. This means that all the signal lines of the left half of the component, which are distributed over the three layers of the electrical component, are connected to common external contacts. Signals that are applied to a given half of the component are thus carried in each case simultaneously by three lines, which are connected to a single ground line.

Figure 26:
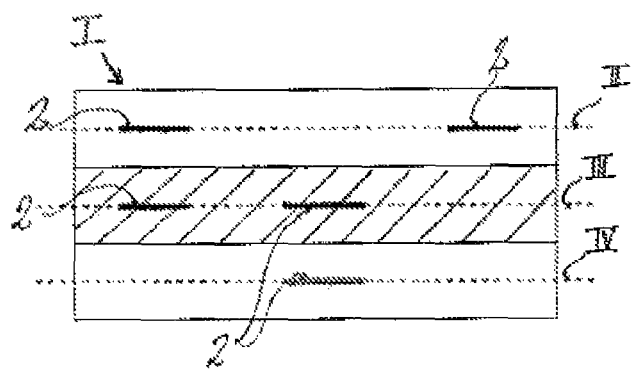
FIGS. 26, 28, 29, 30 show cross sections of a fifth electrical component, A ceramic base body was tested in which zinc oxide was provided as the main part of a function layer and zirconium oxide as the main part of a composite layer, which were alternatingly stacked. During sintering of the base body, cracks formed in the boundary layer between the two layers. Porous boundary layers also formed, and in some cases, the base body failed to sinter.
Figure 27:
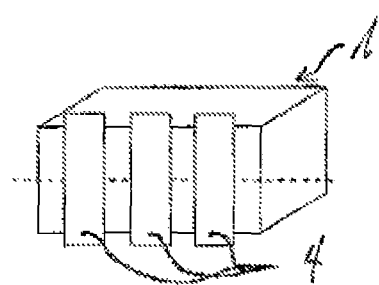

FIG. 26 shows a cross section of another electrical component 1 through a section I (whose position is shown in FIG. 24). Sections of two internal electrodes 2 located in the middle function layer 1a, sections of two internal electrodes 2 within the uppermost composite layer 1b as well as a section of an internal electrode 2 within the bottommost composite layer 1b are shown. FIG. 27 is a perspective representation of an electrical component, some of whose cross sections are shown in FIGS. 26, 28, 29 and 30. Stripe-shaped external contacts 4, as already described in reference to FIG. 7, can be formed which contact the internal electrodes.

Figure 28:
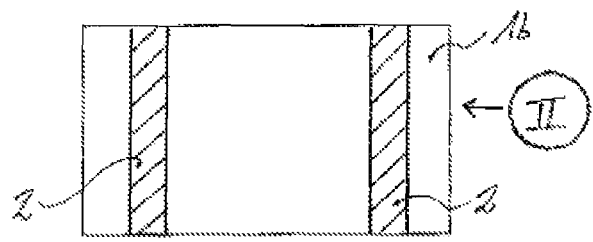

FIG. 28 shows the plane II, which was shown in FIG. 26, of the uppermost composite layer 1b. In each case two internal electrodes 2 or signal lines 2, located in a right or in a left half of the component, are shown, which each completely cross the composite layer laterally and are contacted each at one end to an external contact 4.

Figure 29:
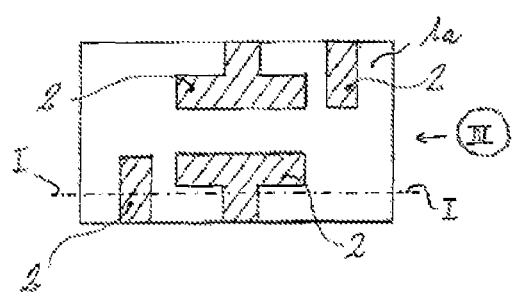

FIG. 29 shows the plane III, which was shown in FIG. 27, of the middle function layer 1a of the electrical component. The construction, arrangement and effects of the internal electrodes or signal lines 2 or T-shaped ground electrodes correspond to those of FIG. 9 and the associated description.

Figure 30:
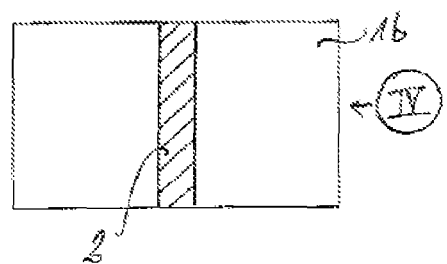

FIG. 30 shows the plane IV, which was shown in FIG. 26, of the bottommost composite layer 1b. An internal electrode 2 or signal line is shown, which laterally crosses the plane IV completely and is contacted to the same external contacts 4 as the T-shaped ground electrodes of the function layer 1a. This means that the single signal line of the bottommost composite layer with small stray capacitance carries, together with the ground electrodes 2 of the function layer 1a, signals or electrical currents, which can be reliably diverted.

The invention claimed is:

1. An electrical component, comprising:
   a ceramic base body comprising several ceramic layers, the several ceramic layers including:
   a function layer containing a function ceramic; and
   a composite layer that includes an internal electrode, the composite layer bordering the function layer, the composite layer comprising zirconium oxide and a glass filler,
   wherein the composite layer excludes a material type of the function layer and said ceramic base body comprises two, separate composite layers each bordering said function layer in each case forming the top and bottom of the base body.

2. The electrical component of claim 1, wherein a dielectric constant of the composite layer is smaller than a dielectric constant of the function layer.

3. The electrical component of claim 1, wherein the composite layer is configured to provide passivation or electrical insulation.

4. The electrical component of claim 1, wherein a mixture of the zirconium oxide and the glass filler of the composite layer further comprises zinc boron silicate or aluminum silicate.

5. The electrical component of claim 1, wherein the glass filler is present in a proportion of 5-30 wt % of a mixture of the zirconium oxide and glass filler.

6. The electrical component of claim 1, further comprising additional functional layers stacked alternately mutually superimposed with additional composite layers.

7. The electrical component of claim 1, wherein the function layer includes a plurality of internal electrodes electrically connected to at least one external contact on a surface of the electrical component.

8. The electrical component of claim 7, wherein, at least two of the plurality of internal electrodes having different electrical potentials are configured to form a capacitor.

9. The electrical component of claim 8, wherein each of the internal electrodes is configured to function as a signal line.

10. The electrical component of claim 7, wherein at least one internal electrode of the plurality of internal electrodes comprises a ground electrode.

11. The electrical component of claim 10, wherein the ground electrode is capacitively coupled to another internal electrode of the function layer.

12. The electrical component of claim 7, wherein at least some of the plurality of internal electrodes are connected to an external contact on a surface of the electrical component at the same electrical potential.

13. The electrical component of claim 7, wherein the internal electrodes of the function layer are partially in the interior of the electrical component and are connected only at one end to an external contact.

14. The electrical component of claim 1, wherein the composite layer comprises at least one internal electrode.

15. The electrical component of claim 14, wherein the composite layer is configured to reduce stray capacitance generated by the at least one internal electrode of the composite layer.

16. The electrical component of claim 14, wherein the at least one internal electrode of the composite layer comprises a signal line.

17. The electrical component of claim 14, wherein the at least one internal electrode of the composite layer comprises a ground electrode.

18. The electrical component of claim 14, wherein the at least one internal electrode of the composite layer is configured to reduce the coupling capacitance between two internal electrodes of the function layer.

19. The electrical component of claim 18, wherein the at least one internal electrode of the composite layer is configured to reduce the coupling capacitance between a ground electrode and an internal electrode of the function layer.

20. The electrical component of claim 14, wherein the internal electrode of the composite layer crosses and is connected at each end to an external contact.

21. The electrical component of claim 7, wherein at least one internal electrode of the plurality of internal electrodes is square, rectangular, T-shaped, L shaped, curved, or meandering in shape.

22. The electrical component of claim 7, wherein several internal electrodes of the plurality of internal electrodes are shaped identically and located in a plane in a mirror-symmetrical arrangement with respect to an axis of symmetry.

23. The electrical component of claim 1, wherein the function layer is doped.

24. The electrical component of claim 1, wherein the composite layer is doped.

25. The electrical component of claim 1, wherein the function layer comprises a varistor ceramic.

26. The electrical component of claim 1, wherein the function layer comprises a capacitor ceramic.

27. The electrical component of claim 1, wherein at least one internal electrode is connected to the function layer and the function layer is connected by a contacting device to an external contact on a surface of the electrical component.

28. The electrical component of claim 27, wherein the contacting device comprises a through-contact filled with a metal-containing material.

29. The electrical component accord of claim 27, wherein several internal electrodes of the plurality of internal electrodes are mutually superimposed and contacted to each other by the contacting device.

30. The electrical component of claim 1, further comprising an intermediate buffer layer between the function layer and the composite layer, the intermediate buffer layer comprising glass originating from the composite layer.

31. An electrical component module comprising:
an electrical component comprising:
a ceramic base body comprising several ceramic layers, the several ceramic layers including:
a function layer containing a function ceramic; and
a composite layer that includes an internal electrode, the composite layer bordering the function layer, the composite layer comprising zirconium oxide and a glass filler, the composite layer excludes a material type of the function layer and said ceramic base body comprising two composite layers each bordering said function layer in each case forming the top and bottom of the base body and
a plurality of internal electrode sets arranged next to each other in the electrical component.

32. Electrical component module according to claim 31, wherein each internal electrode set is connected to external contacts assigned to it.

33. The electrical component of claim 1, wherein the function layer physically isolates the two separate composite layers.

34. The electrical component module of claim 31, wherein the function layer physically isolates the two separate composite layers.

35. An electrical component, comprising:
a ceramic base body comprising several ceramic layers, the several ceramic layers including:
a function layer containing a function ceramic; and
a composite layer that includes an internal electrode, the composite layer bordering the function layer, the composite layer comprising zirconium oxide and a glass filler,
wherein;
the composite layer has a first region made from a first material;
the function layer has a second region made from a second material, different from the first material;
the first region is in contact with the second region; and
said ceramic base body comprises two, separate composite layers each being adjacent to the function layer in each case forming the top and bottom of the base body.

* * * * *